April 4, 1944.   C. H. GEMBERLING   2,345,803
DISK HARROW
Filed Jan. 1, 1942   3 Sheets-Sheet 1
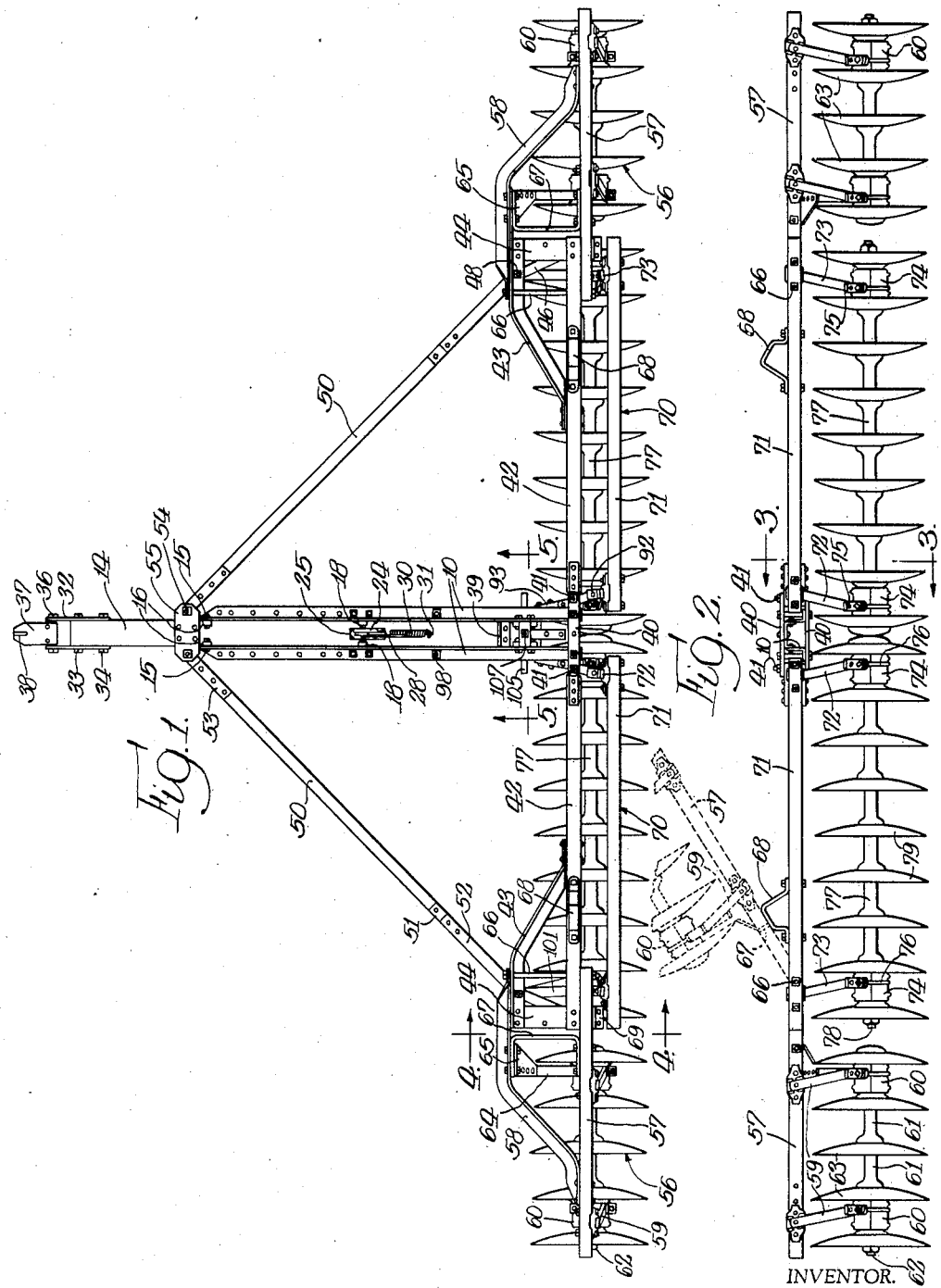
INVENTOR.

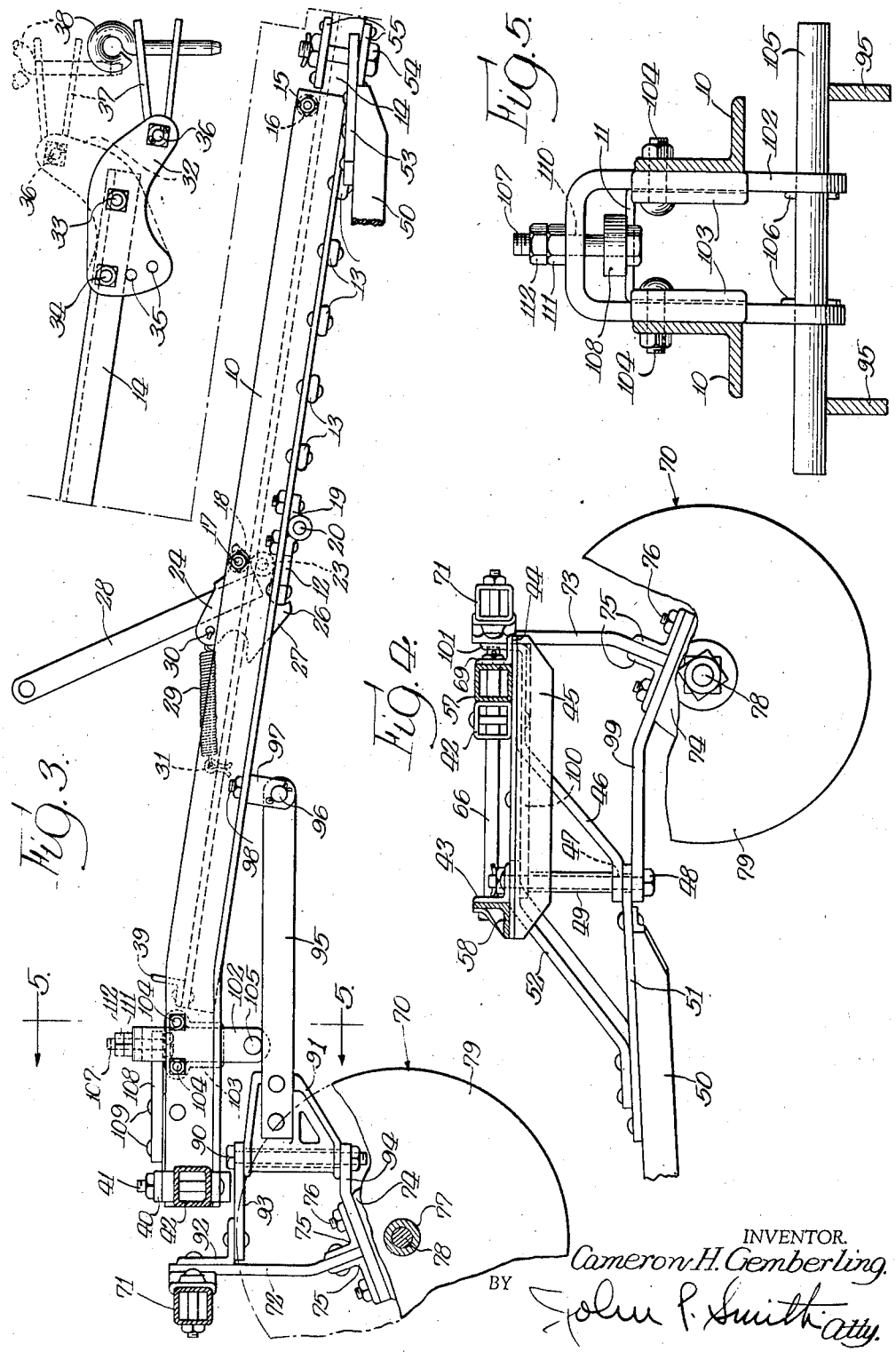

April 4, 1944.        C. H. GEMBERLING        2,345,803
DISK HARROW
Filed Jan. 1, 1942        3 Sheets-Sheet 3
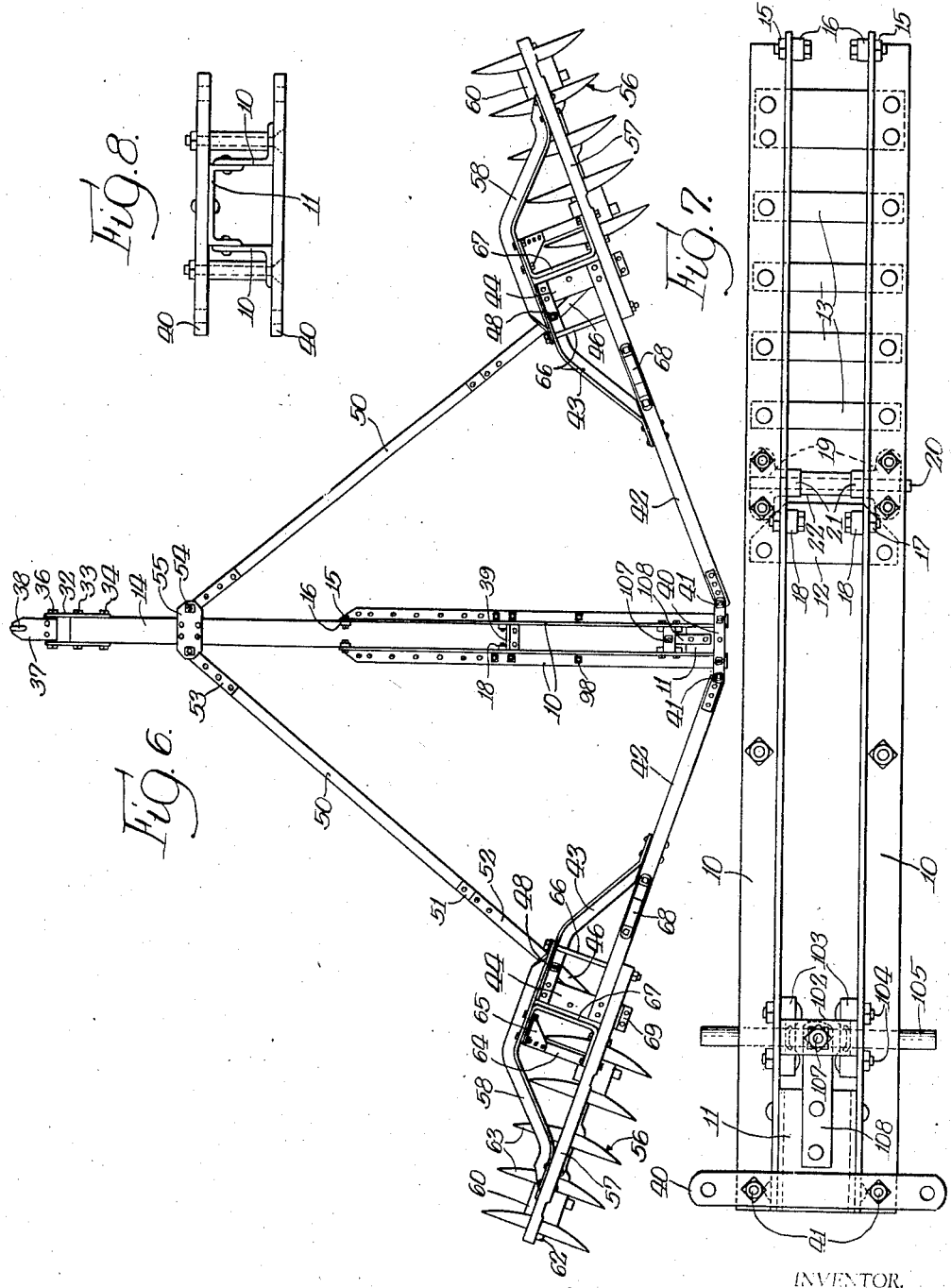

Patented Apr. 4, 1944

2,345,803

UNITED STATES PATENT OFFICE 2,345,803

DISK HARROW

Cameron H. Gemberling, South Bend, Ind., assignor to Oliver Farm Equipment Company, a corporation of Delaware Application January 1, 1942, Serial No. 425,267

14 Claims. (Cl. 55—81)

The present invention relates generally to disk harrows, but more particularly to a wide folding type disk harrow embodying certain novel features of construction and functions of operation.

Another object of the invention is to provide a novel and improved folding disk harrow of the draft actuated angling type of disk gangs, the actuation of which is procured through operative telescoping draft members and in which the main frame of the harrow forms a unit within itself to which the inner disk gangs and outer disk gangs are pivotally attached and supported therefrom.

Another object of the invention is to provide a novel and improved folding type relatively wide disk harrow in which the inner pair and outer pair of disk gangs are attached to the main frame of the harrow construction in a novel and improved manner whereby the inner pair of gangs may float within certain limitations with respect to the main frame for following the uneven contour of the ground.

A still further object of the invention is to provide a novel and improved type of wide folding disk harrow in which separate means are provided for levelling the inner disk gangs and the outer disk gangs.

A further object of the invention is to provide a novel and improved disk harrow construction whereby the inner disk gangs are pivotally attached to the outer portions of the main frame and controlled thereby to reduce the pressure on the bumpers located at the inner end of said gangs so that the inner ends thereof may be free to move up and down without interference with one another in following the uneven contour of the ground.

A still further object of the invention is to provide a novel and improved disk harrow construction in which the cord or rope for controlling the trip from the operator's seat on the tractor is connected to the trip lever mounted on the draft connection which remains relatively fixed with respect to the tractor and thereby avoids unnecessary slackness of the control cord which often occurs when the trip and its associated cord is connected to the relatively movable draft member of the conventional type of draft actuated angling disk harrow.

These and other objects are accomplished by providing a construction and an arrangement of the various parts in the manner hereinafter described and particularly pointed out in the appended claims.

Referring to the drawings:

Fig. 1 is a top plan view of my improved disk harrow construction;

Fig. 2 is a rear elevational view of the same showing the manner in which the outer gangs may be folded to dotted line positions for transportation purposes;

Fig. 3 is an enlarged cross sectional view taken on the line 3—3 in Fig. 2;

Fig. 4 is an enlarged cross sectional view taken on the line 4—4 in Fig. 1;

Fig. 5 is a fragmentary cross sectional view taken on the line 5—5 in Fig. 1;

Fig. 6 is a top plan view showing my improved harrow with the outer gangs angled into working position and with the inner gang detached or omitted from the drawings;

Fig. 7 is a fragmentary top plan view of one of the main frame draft members; and Fig. 8 is an end elevational view of the draft member shown in Fig. 7.

In illustrating one form of my invention, I have shown the same as comprising a primary or main frame unit to which the inner and outer gangs are flexibly or detachably connected so that they are presented with sufficient freedom in an up and down direction with respect to the main frame so as to follow the contour or unevenness of the ground. This main frame construction is best illustrated in Figs. 1, 2 and 6 of the drawings and comprises two longitudinally extending and laterally spaced apart main frame members or angles 10. The rear end of the main frame members 10 are held in spaced relation by an inverted U-shaped member or spacer 11. The intermediate portion of the main frame members 10 are held in spaced relation with respect to each other by a spacer plate 12. Located at uniform intervals along the forward portion of the main frame members 10 are transverse lock bars 13. These bars are secured to the lower side of the angle members 10 for forming locks or stops for locking the angular position of the gangs in a manner hereinafter described. Telescopically mounted within the vertical walls of the angle members 10 is a draft-actuated supplemental frame member in the form of a longitudinally extending and relatively movable channel or draft beam 14. Journaled on suitable bolts 15 secured to the forward ends of the angle members 10 are rollers 16 which engage and guide the upper surface of the draft actuated channel member 14. Journaled on suitable bolts 17 at an intermediate portion of the angle members 10 are rollers 18 which also engage and guide the upper surface of the draft actuated channel member 14. Secured to the underside of each of the angle members 10 adjacent the spacer plate 12 are brackets 19. Mounted in the brackets 19 is a transverse shaft or pin 20. Journaled on the shaft 20 are rollers 21 located inside the inner wall of each of the angle members 15 and held in spaced relation by spacer sleeve 22. These rollers 21 together with the rollers hereinbefore described, eliminate friction and permit the free movement of the draft members with respect to one another. Pivoted on a pin 23 secured to an intermediate portion of the side walls of the channel member 14 is a latch or locking member 24 which extends through a rectangular opening 25 in the top portion of the channel member 14. (See Fig. 1 of the drawings.) The lower or free end of this latch member is provided with a hook portion 26 which is adapted to engage any one of the stops or bars 12 and 13 for locking the angular position of the gangs in the manner hereinafter described. The rear portion of the locking member 24 is provided with an upwardly bevelled portion as shown at 27 so as to permit the same to ride over the transverse bars 12 and 13 on the rearward movement of the draft member 14 with respect to the draft members 10. Secured to the latch member 24 is an upwardly projecting lever 28 which may be connected by means of a cord or rope to the operator's seat on the tractor. The latch 24 is normally actuated to engage the locking bars 12 and 13 by an extension spring 29 which has one end thereof connected as shown at 30 to the latch member 24 and the other end thereof connected as shown at 31 by a pin to the channel member 14. Adjustably secured to the forward end of the draft member 14 are clevis plates 32 which have their intermediate portions secured thereby by means of a bolt 33 and their rear portions secured by means of a bolt 34. The rear portion of these clevis plates 32 are provided with a series of apertures 35 located at equal distances from the bolt 33 so that the foremost ends of the plates 32 may be adjusted to various positions for height with respect to the draft member 14. If necessity requires, the plates may be inverted to their dotted line position shown in Fig. 3 of the drawings for raising or lowering the draft member 14 with respect to the draft bar of the tractor. This adjustment, as will hereinafter be more fully described, is employed for levelling the outer disk gangs. Pivotally connected to a bolt 36 is a draft shackle 37 and detachably mounted in aligned apertures in the forward end of the shackle 37 is a clevis pin 38 for attaching the forward end of the draft connection to the tractor. Secured to the rear end of the draft member 14 on the top side thereof is a stop or angle member 39 which is adapted to engage the roller 18 for limiting the forward movement of the draft member 14 with respect to the draft angles 10. Secured to the rear of the main frame members 10 are two spaced apart transversely arranged plates 40. Pivotally secured to the opposite ends of the plates 40 by means of bolts 41 are outwardly projecting or laterally extending main frame members 42. Secured to the outer ends of each of the main harrow frame members 42 are supplemental offset frame members 43. The outer ends of the main frame members 42 and supplemental frame members 43 are secured in spaced relation with respect to each other by flat plates 44. (See Figs. 1, 4 and 6 of the drawings.) Secured to the underside of the flat plates 44 are reinforcing angle members 45. Secured to the underside of the plates 44 are diagonally disposed supports 46. The lower or forward ends of these diagonal supports 46 are apertured as shown at 47 and are adapted to receive the vertically extending bolts 48 which have their upper ends extending through apertures adjacent the outer ends of the supplemental frame members 43. Surrounding each of the bolts 48 is a spacer tube 49. Pivotally connected to each of the bolts 48 and converging forwardly towards the draft member 14 are supplemental draft members 50. The rear ends of these draft members 50 are pivotally attached to the lower end of each of the bolts 48 by a flat bar 51. Secured to each of the members 50 is a diagonal strap 52 which has its upper end pivotally attached adjacent the upper end of each of the bolts 48. The forward ends of these forwardly converging supplemental draft members 50 are pivotally connected by a strap 53 to the opposite bolts 54 between transverse plates 55 which in turn are secured to the draft member 14 adjacent the forward end thereof.

The construction which includes the member 10 and transverse members 42 and 43, constitute the main frame of the harrow to which the inner disk gangs are flexibly connected and disconnected and may be connected independently of the outer disk gang. Similarly, the outer disk gangs are flexibly connected to the main frame of the harrow independently of the inner disk gangs. Each of the outer disk gangs may be folded to the dotted line position shown in Fig. 2 of the drawings and be supported on the main frame of the harrow for transporting the harrow as a whole and permit it to pass through narrow gateways.

The outer disk gangs generally indicated by the reference character 56 comprise relatively short frame members 57 of square and hollow construction and supplemental offset angle frame members 58. Secured to the frame members 57 are substantially vertically depending supports 59 which in turn are connected to bearing housings 60 in a manner well understood in the art. Journaled in the housings 60 through the medium of spacer spools 61 and a bolt or shaft 62 are disks 63. The inner housing 60 of each of the disk gangs 56 is reinforced by a diagonal brace 64 which has its upper end secured to the supplemental frame member 58 by a triangular plate 65. The inner ends of the frame members 57 and 58 of each of the outer gangs 57 are pivotally attached by means of a bolt 66 to the outer ends of each of the main frame members 42 and 43 of the main frame of the harrow. For transporting purposes, each of the outer disk gangs 56 may be swung about its pivot on the bolt 66 to the dotted line position shown in Fig. 2 of the drawings, where a U-shaped member 67 secured to the frame members 57 and 58 of each of the gangs 56 may rest against a stop or rest 68 secured to the main frame member 42. When the outer gangs are in their unfolded position or the full-line position shown in Figs. 1 and 2 of the drawings, an angle member 69 is secured to each of the plates 44 to form in effect a recess or stop to engage the rear side of each of the frame members 57 to support the rearward thrust of the outer gangs with respect to the main frame.

The inner disk gangs, generally indicated by the reference character 70, are flexibly connected to the main harrow frame so that the inner ends thereof may be moved freely up and down independently of each other, but are pivotally connected at their outer ends to the main frame of the harrow so as to eliminate the inward pressure or friction usually caused by having the bumpers of the innermost disks abutting one another. The inner disk gangs comprise transverse frame bars in the form of square tubular members 71. Secured to the opposite ends of each of the frame members 71 are substantially vertically depending standards or supports 72 and 73. The lower ends of these supports are secured to bearing housings 74 by angle brackets 75 and U-bolts 76. Journaled in the bearing housing 74 by means of spacer spools 77 and a shaft or bolt 78 are spaced apart disks 79. The inner ends of the inner disk gangs are pivotally attached to vertically disposed bolts 90 mounted in each of the pivot brackets 91. The inner ends of each of the frame members 71 are pivotally connected to the bolts 90 through angle brackets 92 and straps or bars 93. The lower ends of each of the bolts 90 form the pivotal connections for each of the offset bars 94 which have their rear portions secured to the inner housings 74 by the angle brackets 75 and U-bolts 76. (See Fig. 3 of the drawings.) Secured to the forward ends of each of the pivot brackets 91 are forwardly projecting links 95 which have their forward ends pivotally connected as shown at 96 to a depending bracket 97 secured by means of bolts 98 to each of the main frame members 10. The outer ends of each of the inner disk gangs 70 are pivotally attached to each of the vertically disposed bolts 48 by two substantially horizontally disposed and spaced apart bars 99 and 100. The forward ends of the upper bars 100 are pivoted on each of the bolts 48 between the spacer tubes 49 and the upper ends of each of the diagonal braces 52. The rear ends of each of the bars 100 have right angularly bent portions as shown at 101, which in turn, are secured to the vertical supports 73 and the frame member 71. The lower bars 99 are pivotally attached at their forward ends to the bolts 48 at points adjacent their lower ends. The rearward ends of the bars 99 are bent slightly downwardly and are bolted between each of the housings 74 and angle brackets 75 by the U-bolts 76. (See Fig. 4 of the drawings.)

The inner ends of the inner gangs 70 are leveled or limited in their upward movement with respect to the main frame of the harrow by means of an inverted U-shaped member 102 (see Figs. 3 and 5 of the drawings), which is mounted between the longitudinally extending angle frame members 10. This inverted U-shaped member 102 is slidably and adjustably mounted between clamping guide members 103 secured to the inner side walls of the opposite angle members 10 by means of bolts 104. Extending through aligned apertures in the lower legs of the inverted U-shaped member 102 is a shaft 105. The shaft 105 is prevented from displacement from its support 102 by oppositely disposed cotter pins 106. This pin or shaft 105 is positioned above and is adapted to engage the upper edge of the draft links 95 for depressing the inner ends of the inner disk gangs 70 for levelling or limiting the upward movement of the inner ends of these gangs. The U-shaped member 102 is vertically adjustable between the guide brackets 103 by a bolt 107 which extends through an apertured end of a bar 108 secured to the spacer plate 11 by bolts 109. The other end of the bolt 107 extends through an aperture 110 in the U-shaped member 102. Mounted in threaded engagement with the bolt 107 is an adjustable nut 111 and lock nut 112.

From the above description it will be obvious that the inner ends of the inner disk gangs 70 may be depressed or permitted to be raised with respect to the outer ends of these gangs and the main frame of the harrow by loosening the bolts 104 in the clamping guides 103 so that the U-shaped member 102 may be vertically adjusted by adjusting the nuts 111 and 112 on the bolt 107. This adjustment raises or lowers the shaft 105, which in turn, contacts the upper edge of the links 95 to either depress or permit them to rise for levelling the gangs as clearly disclosed in Figs. 3 and 5 of the drawings. In this connection it will also be noted that the outer disk gangs 56 may be levelled so that the outermost ends of each of these gangs are raised or depressed by changing the elevation of the draft member 14 with respect to its draft connection with the draw bar of the tractor. This is accomplished by adjusting the clevis plate 32 so that the bolt 34 extends through any one of the variety of apertures 35 in these plates or by reversing the plates to the dotted line position shown in Fig. 3 of the drawings. By referring to Fig. 6 of the drawings, it will be obvious that when the outer gangs 56 are angled to their working position, as disclosed in this figure, the elevation or depression of the draft member 14 with respect to its forward attachment on the draw bar of the tractor will elevate or depress the outermost ends of the outer gangs 56 with respect to their inner ends so as to secure a levelling of these particular disks.

Summarizing the function and operation of my improved disk harrow, it will be obvious that by providing a forward main harrow frame to which the inner gangs are independently connected as well as flexibly connected to the main frame, the gangs may follow the uneven contour of the ground. It will be further noted that by pivotally connecting the outer ends of the inner gangs to the outer ends of the harrow main frame, the bumpers on the inner adjacent ends of the inside gangs are relieved of inward pressure when the gangs are operating in their normal angle position. It will also be noted that the inner gangs may be levelled by adjusting the inverted U-shaped member 102 so as to depress or elevate the gangs at this point in the manner previously described. The folding outer disk gangs 56 are separately and independently connected to the main frame independent of the inner gangs and by reason of their pivotal connection, are flexible with respect to the main frame so as to follow the uneven contour of the ground. These outer disk gangs may be levelled or adjusted with respect to the ground by raising and lowering the forward end of the draft member through the medium of adjusting the shackle plates 32 with respect to the forward end of the draft member. For transporting purposes, and to permit the harrow to pass through narrow gateways and the like, the outer gangs may be folded to their dotted line position as shown in Fig. 2 of the drawings.

Both inner gangs and outer gangs of the disk harrow may be angled to their working position or the position similar to that shown in Figure 6 of the drawings, by pulling the cord or rope connected on the trip lever 28 to a point adjacent the operator's seat on the tractor, after which the tractor may be moved forwardly carrying with it the relatively movable draft member 14 together with the supplemental draft members 50, while the other draft members 10 remain substantially stationary. When all the gangs have reached the desired angular adjustment with respect to the main frame, the lever is released and the locking portion 26 of the latch 24 is adapted to engage one of the cross bars 13 for retaining or locking all of the gangs in the desired angular position for harrowing operation. Should the operator desire to straighten the gangs for transportation purposes, the tractor is merely backed and the bevelled portion 27 of the latch 24 will ride over the locking bars 13 and 12 as the draft member 14 is actuated rearwardly with respect to the draft member 10 to straighten the gangs from their angular position to the straight position shown in Figure 1 of the drawings.

From the above specification it will be seen that I have provided a simple harrow construction in which all the gangs, both inner and outer, are not only independently connected to the main frame of the harrow, but are also connected thereto so as to afford the maximum flexibility to the individual gangs independent of one another so that the same may follow the uneven contour of the ground. This construction also permits means for separately levelling the inner and outer gangs with respect to the ground.

While in the above specification I have described one embodiment which my invention may assume in practice, it will of course be understood that the same is capable of modification and that modification may be made without departing from the spirit and scope of the invention as expressed in the following claims.

What I claim as my invention and desire to secure by Letters Patent is:

1. A disk harrow comprising a main frame, a relatively movable supplemental frame carried by said main frame, inner disk gangs having their outer ends pivoted to said supplemental frame, and their inner ends flexibly connected to said main frame, and outer disk gangs pivotally connected to said main frame in substantial co-axial alignment with and independent of said inner disk gangs.

2. A disk harrow comprising a main frame, a relatively movable supplemental frame carried by said main frame, inner disk gangs having their outer ends pivoted to said supplemental frame and their inner ends flexibly connected to said main frame, and outer folding disk gangs pivotally connected to said main frame in substantial co-axial alignment with and independent of said inner disk gangs.

3. A disk harrow comprising a main frame, a relatively movable supplemental frame carried by said main frame, inner disk gangs having their outer ends pivoted to said supplemental frame and their inner ends flexibly connected to said main frame, outer disc gangs pivotally connected to said main frame in substantial co-axial alignment with and independent of said inner disc gangs, and means mounted on said main frame for levelling said inner disk gangs independently of said outer disk gangs.

4. A disk harrow comprising a main frame, a relatively movable supplemental frame carried by said main frame, inner disk gangs having their outer ends pivoted to said supplemental frame and their inner ends flexibly connected to said main frame, outer disk gangs pivotally connected to said main frame in substantial co-axial alignment with and independent of said inner disk gangs, and separate means mounted on said main frame for independently levelling said outer and inner disk gangs.

5. A disk harrow comprising a main frame, a relatively movable supplemental frame carried by said main frame, inner disk gangs having their outer ends pivoted to said supplemental frame and their inner ends flexibly connected to said main frame, outer disk gangs pivotally connected to said main frame in substantial co-axial alignment with and independent of said inner disk gangs, and means forming a part of said main frame for simultaneously angling all of said gangs.

6. A disk harrow comprising a main frame, said main frame including a longitudinally extending draft member, transverse frame members having their inner ends pivotally connected to said draft member, a supplemental and relatively movable draft member slidably connected to said first named draft member, diagonal draft members having their forward ends pivotally connected to said relatively movable draft member and their rear ends pivotally connected to the outer ends of said transverse frame members, disk gang frames having their outer ends connected to pivots common with the pivots of the rear ends of said diagonal draft members, and means for flexibly connecting the inner ends of said gang frames to said longitudinally extending draft member.

7. A disk harrow comprising a main frame, said main frame including a longitudinally extending draft member, transverse frame members having their inner ends pivotally connected to said draft member, a supplemental and relatively movable draft member slidably connected to said first named draft member, diagonal draft members having their forward ends pivotally connected to said relatively movable draft member and their rear ends pivotally connected to the outer ends of said transverse frame members, disk gang frames having their outer ends connected to pivots common with the pivots of the rear ends of said diagonal draft members, means for flexibly connecting the inner ends of said gang frames to said longitudinally extending draft member, and means mounted on said main frame and engageable with the inner connections of said gangs for levelling said gangs.

8. A disk harrow comprising a main frame, said main frame including a longitudinally extending draft member, transverse frame members having their inner ends pivotally connected to said draft member, a supplemental and relatively movable draft member slidably connected to said first named draft member, diagonal draft members having their forward ends pivotally connected to said relatively movable draft member and their rear ends pivotally connected to the outer ends of said transverse frame members, disk gang frames having their outer ends connected to pivots common with the pivots of the rear ends of said diagonal draft members, and disk gangs pivoted to said transverse frame members extending laterally beyond and independent of said first named gangs.

9. A disk harrow comprising a main frame, said main frame including a longitudinally extending draft member, transverse frame members having their inner ends pivotally connected to said draft member, a supplemental and relatively movable draft member slidably connected to said first named draft member, diagonal draft members having their forward ends pivotally connected to said relatively movable draft member and their rear ends pivotally connected to the outer ends of said transverse frame members, disk gang frames having their outer ends connected to pivots common with the pivots of the rear ends of said diagonal draft members, and foldable disk gangs pivoted adjacent the outer ends of said transverse members and adapted to extend in substantial axial alignment with and laterally outside said first named gangs.

10. A disk harrow comprising a main frame, said main frame including a longitudinally extending draft member, transverse frame members having their inner ends pivotally connected to said draft member, a supplemental and relatively movable draft member slidably connected to said first named draft member, diagonal draft members having their forward ends pivotally connected to said relatively movable draft member and their rear ends pivotally connected to the outer ends of said transverse frame members, disk gang frames having their outer ends connected to pivots common with the pivots of the rear ends of said diagonal draft members, disk gangs pivoted to said transverse frame members extending laterally beyond and independent of said first named gangs, and separate means mounted on said frame for independently levelling said first named gangs and said second named gangs.

11. A disk harrow comprising a main frame, said main frame including a longitudinally extending draft member, transverse frame members having their inner ends pivotally connected to said draft member for horizontal movement only, a supplemental and relatively movable draft member slidably connected to said first named draft member, diagonal draft members having their forward ends pivotally connected to said relatively movable draft member and their rear ends pivotally connected to the outer ends of said transverse frame members, for horizontal movement disk gangs having their outer ends connected to pivots common with the pivots of the rear ends of said diagonal draft members, disk gangs pivoted to said transverse frame members extending laterally beyond and independent of said first named gangs, and means mounted on said relatively movable draft member for levelling said last named gangs independently of said first named gangs.

12. A disk harrow comprising a main frame, said main frame including a longitudinally extending draft member, transverse frame members having their inner ends pivotally connected to said draft member for horizontal movement only, a supplemental and relatively movable draft member slidably connected to said first named draft member, diagonal draft members having their forward ends pivotally connected to said relatively movable draft member and their rear ends pivotally connected to the outer ends of said transverse frame members, for horizontal movement disk gangs having their outer ends connected to pivots common with the pivots of the rear ends of said diagonal draft members, disk gangs pivoted to said transverse frame members extending laterally beyond and independent of said first named gangs, and adjustable draft clevis connected to the forward end of said first named draft member for levelling said last named gangs.

13. A disk harrow comprising a main frame, said main frame including a longitudinally extending draft member, transverse frame members having their inner ends pivotally connected to said draft member, a supplemental and relatively movable draft member slidably connected to said first named draft member, diagonal draft members having their forward ends pivotally connected to said relatively movable draft member and their rear ends pivotally connected to the outer ends of said transverse frame members, disk gang frames having their outer ends connected to pivots common with the pivots of the rear ends of said diagonal draft members, means for connecting the inner ends of said gangs to said longitudinally extending draft member, and locking means carried by said relatively movable draft member and engageable with said first named draft member for locking said gangs in various angular relations.

14. A disk harrow comprising a main frame, said main frame including a longitudinally extending draft member, transverse frame members having their inner ends pivotally connected to said draft member, a supplemental and relatively movable draft member slidably connected to said first named draft member, diagonal draft members having their forward ends pivotally connected to said relatively movable draft member and their rear ends pivotally connected to the outer ends of said transverse frame members, disk gang frames having their outer ends connected to pivots common with the pivots of the rear ends of said diagonal draft members, means for connecting the inner ends of said gang frames to said longitudinally extending draft member, a trip lever lock carried by said relatively movable draft member, transverse spaced apart bars carried by said first named draft member and adapted to be engaged by said lock for locking said gangs in various angular relations.

CAMERON H. GEMBERLING.